(12) United States Patent
Palapudi

(10) Patent No.: US 7,461,221 B2
(45) Date of Patent: Dec. 2, 2008

(54) APPARATUS, SYSTEM, AND PROGRAM FOR AUTOMATIC BACKUP OF RELATED DATA

(75) Inventor: Sriram Palapudi, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 11/088,662

(22) Filed: Mar. 24, 2005

(65) Prior Publication Data

US 2006/0218363 A1 Sep. 28, 2006

(51) Int. Cl.
*G06F 12/00* (2006.01)

(52) U.S. Cl. ...................................... 711/162

(58) Field of Classification Search ........................ None
See application file for complete search history.

(56) References Cited

U.S. PATENT DOCUMENTS

| | | | | |
|---|---|---|---|---|
| 5,778,165 | A | 7/1998 | Saxon ................... | 395/182.02 |
| 5,987,575 | A | 11/1999 | Yamaguchi .................. | 711/162 |
| 6,260,124 | B1 * | 7/2001 | Crockett et al. ............. | 711/162 |
| 6,397,308 | B1 | 5/2002 | Ofek et al. .................. | 711/162 |
| 6,446,175 | B1 * | 9/2002 | West et al. .................. | 711/162 |
| 6,487,645 | B1 | 11/2002 | Clark et al. ................. | 711/162 |
| 6,643,671 | B2 * | 11/2003 | Milillo et al. ............... | 707/204 |
| 6,721,862 | B2 | 4/2004 | Grant et al. ................. | 711/162 |
| 6,732,244 | B2 | 5/2004 | Ashton et al. ............... | 711/162 |
| 6,757,698 | B2 * | 6/2004 | McBride et al. ............. | 707/204 |
| 7,062,541 | B1 * | 6/2006 | Cannon et al. .............. | 709/219 |
| 2002/0133512 | A1 | 9/2002 | Milillo et al. ............... | 707/204 |
| 2003/0004980 | A1 | 1/2003 | Kishi et al. ................. | 707/204 |
| 2003/0140070 | A1 | 7/2003 | Kaczmarski et al. ........ | 707/204 |
| 2005/0071708 | A1 * | 3/2005 | Bartfai et al. ................. | 714/5 |
| 2006/0041823 | A1 * | 2/2006 | Wolfgang et al. ........... | 714/763 |
| 2006/0053332 | A1 * | 3/2006 | Uhlmann et al. .............. | 714/2 |
| 2006/0112345 | A1 * | 5/2006 | Singhal et al. .............. | 715/763 |

FOREIGN PATENT DOCUMENTS

JP 9198283 7/1997

* cited by examiner

*Primary Examiner*—Hiep T Nguyen
(74) *Attorney, Agent, or Firm*—Kunzler & McKenzie

(57) ABSTRACT

An apparatus, system, and program are disclosed for automatically backing up groups of related data. The apparatus includes a plurality of data cells capable of storing data. The apparatus also includes a grouping module configured to group one or more of the data cells into a related group. A tracking module tracks activity on one or more predetermined data cells in the group. A backup module backs up the data stored in the group of data cells upon the occurrence of a predetermined triggering event identified by the tracking module. The triggering event may include I/O activity to one or more predetermined data cells in the group or it may be a cumulative total of I/O activity to the group as a whole.

17 Claims, 5 Drawing Sheets

APPARATUS, SYSTEM, AND PROGRAM FOR AUTOMATIC BACKUP OF RELATED DATA

BACKGROUND OF THE INVENTION

1. Field of the Invention

This invention relates to data transfer between data storage and more particularly to the automatic backup of related data stored in consistency groups across multiple storage cells based upon predetermined triggering events.

2. Description of the Related Art

Information technology is the lifeblood of most businesses in today's world. Data is often a business' most valuable commodity. Data must be protected while being accessible to employees, customers, and/or trading partners across different time zones. In order to prevent data loss due to component or system failure or because of an unforeseen natural disaster, many companies rely on data backup systems. These systems range from small, less expensive devices such as removable tape drives or optical disks, to large storage servers, such as the Enterprise Storage Server (ESS) by IBM®.

Computer systems regularly and sequentially back up data to local or remote storage subsystems. Remote electronic copying of data storage volumes is a frequently used strategy for maintaining continuously available information systems in the presence of potential data loss. Storage systems use different data storage or copy techniques to back up data. Most backup techniques, however, try to achieve two important objectives. First, data storage systems try to maintain an accurate replica of the data. Second, data storage systems try to maintain a consistent replica of the data. Maintaining accuracy requires that as data is copied from one storage medium to another, no errors are introduced. Maintaining consistency requires that as data is copied from one storage medium to another, no data is lost or omitted. Accuracy may be ensured in the case of data corruption or media failure by copying a consistent replica of the data from a backup source.

Ironically, one problem with most backup copy methods and apparatuses lies in their regularity. For example, the system administrator in charge of a business' data may schedule a data backup every night at midnight, when the data is least likely to be used and resources needed to accomplish the backup are least likely to interfere with ongoing business operations. The problem with this approach is that the administrator may have no way of knowing when critical changes to the data occur that need backing up. With round-the-clock access to business data or applications, critical data may be written to memory at 1:00 a.m., right after a data backup. This data is now vulnerable to loss for twenty-three more hours until the next backup occurs.

Some businesses solve this problem by limiting access to data to certain times of the day or to certain people. This approach is unsatisfactory to most businesses that need constant access to data by many people. Another solution is to increase the frequency of the backups. This approach is also problematic because backups require computer resources and time. More frequent data backups increase computer costs and reduce human efficiency. This approach also forces companies to make the unenviable choice between the cost of losing data and cost of backing it up.

From the foregoing discussion, it should be apparent that a need exists for an apparatus, system, and method that do not require an administrator to determine when to backup data. It would be an advancement in the art to provide such an apparatus, system, and method where critical data could be backed up whenever it changes, independent of any backup schedule. It would be a further advancement to provide such an apparatus, system, and method that could automatically backup groups of related data whenever one of the related data changes. Such an apparatus, system, and method are disclosed and claimed herein.

SUMMARY OF THE INVENTION

The present invention has been developed in response to the present state of the art, and in particular, in response to the problems and needs in the art that have not yet been fully solved by currently available data backup systems. Accordingly, the present invention has been developed to provide an apparatus, system, and method for automatically backing up related groups of data that overcome many or all of the above-discussed shortcomings in the art.

The apparatus to automatically backup data is provided with a logic unit containing a plurality of modules configured to functionally execute the necessary steps of identifying a group data cells, tracking activity to one or more data cells in the group, and backing up the group of data cells upon a triggering event to the one or more data cells in the group. These modules in the described embodiments include a grouping module, a tracking module, and a backup module.

The apparatus, in one embodiment, is configured to group one or more of the data cells into a related group. The group may be a consistency group. The apparatus may further be configured to track activity on one or more data cells in the group. In one embodiment, this may be accomplished using bitmaps. In another embodiment, this may be accomplished using software structures. In a further embodiment, the apparatus may be configured to back up the data stored in the group of data cells upon the occurrence of a predetermined triggering event identified by the tracking module. The triggering event may be a write or change to a particular data cell. In another embodiment, the triggering event may include a minimum amount of changes to the group of data cells as a whole.

A system of the present invention is also presented to automatically backup data. The system may be embodied in an enterprise storage server. In particular, the system, in one embodiment, includes a plurality of data cells, one or more of which are grouped together. The system may also include a data communications network with a plurality of communication channels for transmitting data stored in the data cells. In one embodiment, the system includes a source storage device coupled to the data communications network. The source storage device may be configured to establish a plurality of communication links with a target storage device coupled to the data communications network.

The system may also include a host coupled to the data communications network configured to transmit read/write requests to the source storage device. The system may have Input/Output (I/O) devices coupled to the data communications network configured to interact with a user. The system may also include a processor and a memory. The memory in one embodiment may contain the modules discussed above.

Machine readable instructions occupying a signal bearing medium are also presented for automatically backing up data. The machine readable instructions in the disclosed embodiments substantially include the operations necessary to carry out the functions presented above with respect to the operation of the described apparatus and system. In one embodiment, the operations include identifying a group that includes plurality of data cells. The operations may track activity to one or more predetermined data cells in the group. The operations may also back up the group of data cells upon a triggering event to one or more data cells in the group.

Reference throughout this specification to features, advantages, or similar language does not imply that all of the features and advantages that may be realized with the present invention should be, or are, in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
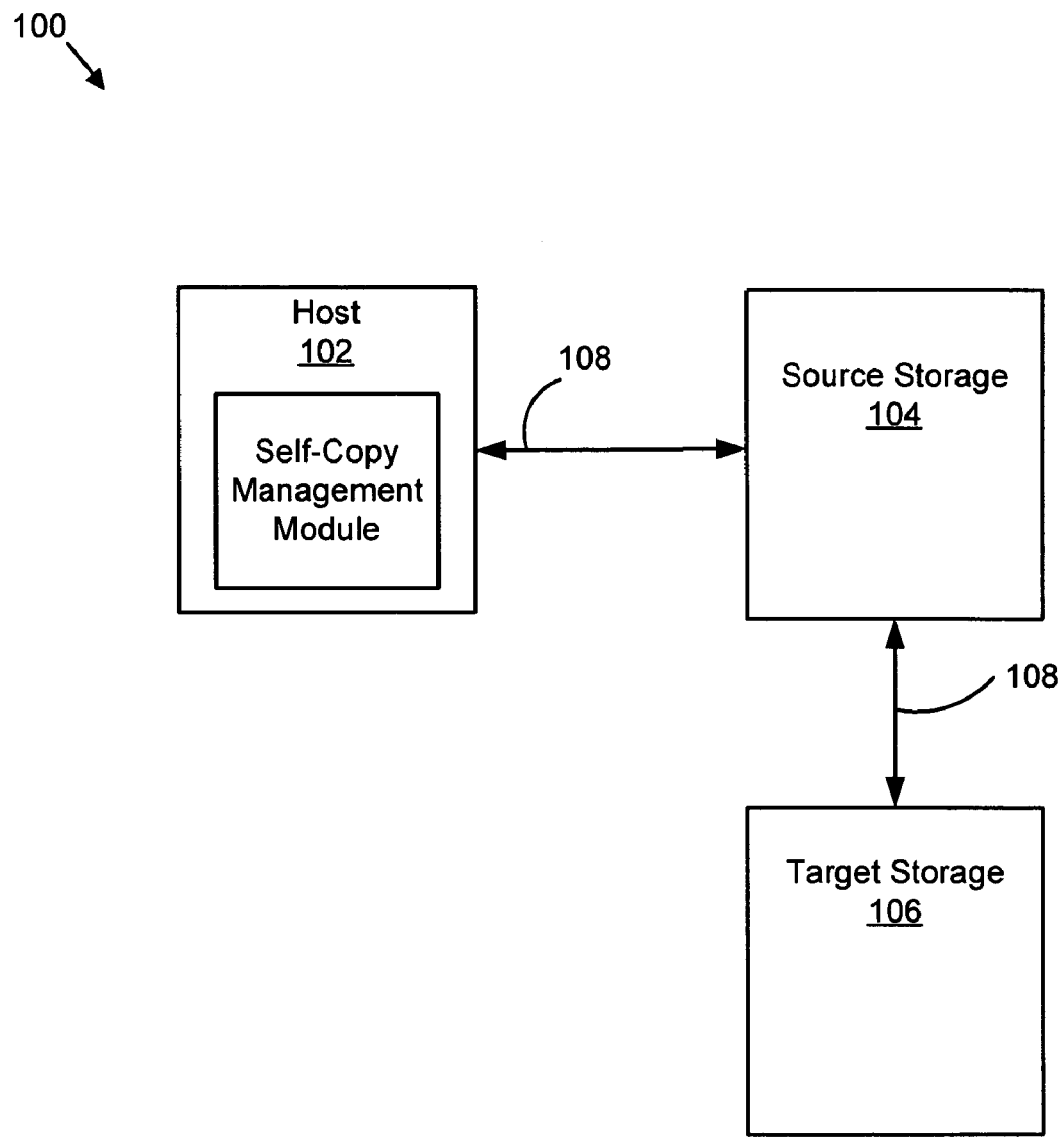
FIG. 1 is a schematic block diagram illustrating one embodiment of a system for backing up data in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal-bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram graphically illustrating one embodiment of a system 100 for automatically backing up data. In one embodiment, the system 100 comprises a host 102 device, at least one source storage device 104, and a target storage device 106. A data communications network 108 may couple the host 102, the source storage device 104, and the target storage device 106. The host 102 may be configured to transmit read/write requests to the source storage device 104 over the data communications network 108.

The data communications network 108 is also configured to establish a plurality of communication links between the source 104 and the target 106 storage devices. The data communication network 108 may be a local area network, wide area network, wireless local area network, virtual private network, virtual local area network, or the like.

In a further embodiment, the data communication network 108 is a storage area network that includes a Fiber Channel transmission medium. Alternatively, the data communication network 108 includes, without limitation, a Gigabit Fiber Channel/FICON™, an Ultra SCSI, an ESCON® connection, and the like. The source 104 and target 106 storage devices are configured to store and backup data. In one embodiment, the source 104 and target 106 storage devices are configured to execute backup or copy commands known to those skilled in the art.

In one embodiment, the source 104 and target 106 storage devices comprise Enterprise Storage Servers (ESS) such as the IBM® TotalStorage™ ESS™ Model 800 manufactured by IBM® of Armonk, N.Y.

The host 102 may include a backup controller 120 or self-copy management module 120 to facilitate the backup of data altered by the host 102. It will be appreciated by those of skill in the art that multiple hosts 102 may be able to access the storage devices. It will also be appreciated by those of skill in the art that the backup controller may reside in part in the source storage 104 or the target storage 106.

Figure 2:
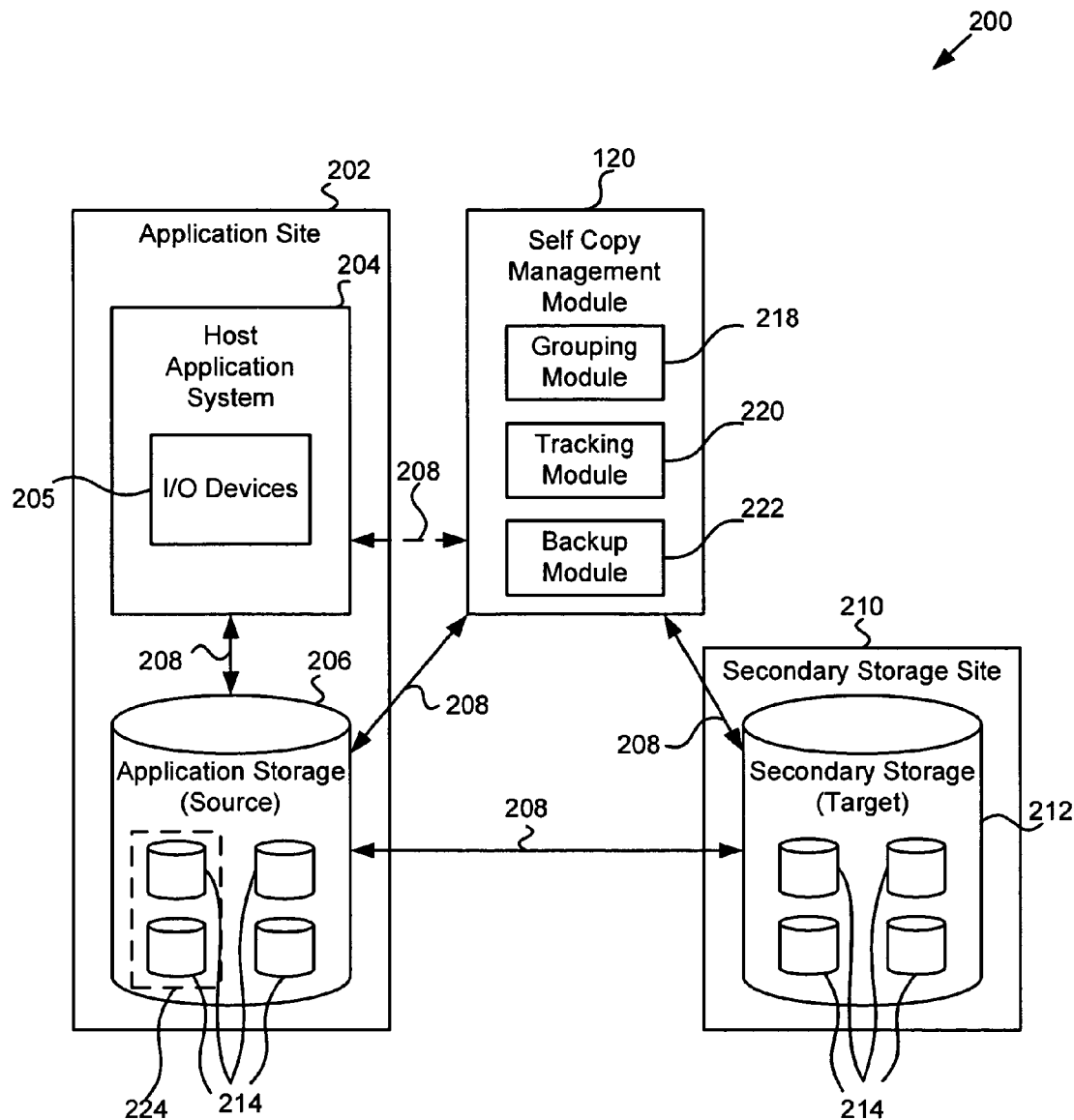
FIG. 2 is a schematic block diagram illustrating an alternative embodiment of the system for backing up data.

FIG. 2 depicts one embodiment of a system 200 for automatically backing up data. An application site 202, for example, includes a host application system 204, and an application or source storage device 206. The source storage device 206 may include one or more data cells 214. The data cells 214 may be anything that can store data, including, but not limited to a volume, a record, a track, a byte, a bit, and the like. In one embodiment, the data cells 214 of the source application 206 may reside in one physical location. In another embodiment, the data cells 214 may reside in multiple physical locations.

The host application system 204 may comprise one or more software programs, other executable commands, and/or hardware components. The host application system 204 may be any combination of computer software and/or hardware. In one embodiment, the host application system 204 contains Input/Output (I/O) devices 205 coupled to the data communications network. These devices may include, without limitation, a monitor, keyboard, mouse, a printer, a touch screen, and the like to allow a user to utilize the system. In another embodiment (not shown), the I/O devices 205 may be separate from the host application 204.

The host application system 204, may be connected to the application or source storage 206 through a data communications network 208 having a plurality of communication channels for transmitting data stored in the data cells 214. In one embodiment, the data communications network 208 is a fiber channel 208. The data communications network 208 may also include, without limitation, copper cable, coaxial cable, communication bus, Transmission Control Protocol/Internet Protocol (TCP/IP) connection, or the like.

A secondary storage site 210, in one embodiment, may comprise a stand-alone secondary or target storage 212 configured specifically for data storage. The secondary storage 212 may comprise hard disk storage, tape back up storage, compact disk storage, or other similar types of computer storage. The application or source site 202 and the secondary storage or target site 210 may be separated by a great distance or may be next to each other.

In one embodiment, the application storage 206 is connected to the secondary storage 212 through a data communication network 208 such as a fiber channel. Again, the connection 208 may comprise a copper network cable, Internet connection, coaxial cable, communication bus or the like. The application storage 406 may comprise hard disk storage, tape back up storage, compact disk storage, or other similar types of computer storage.

The self-copy management module 120, in one embodiment, communicates with the host application system 204, the application or source storage 206, and the secondary or target storage 212. The self-copy management module 120 is connected to the application storage 206 through a data communication network 208. In one embodiment, this connection 208 may be a Transmission Control Protocol/Internet Protocol (TCP/IP) connection. Similarly, the self-copy management module 120 is also connected to the secondary storage 212 through a TCP/IP connection 208. Alternately, the self-copy management module 120 may connect 208 directly to the application system 204 and may communicate with the application storage 206 via the application system 204.

The self-copy management module 120 in one embodiment includes a grouping module 218 for grouping one or more of the data cells 214 into a related group 224. As will be discussed in greater detail below, in one embodiment, the group in one embodiment is a consistency group. The self-copy management module 120 may also include a tracking module 220 to track activity on one or more data cells 214 in the group 224. The embodiment illustrated in FIG. 2 also includes a backup module 222 for backing up the data stored in the group 224 of data cells 214 upon the occurrence of a predetermined triggering event identified by the tracking module 220. The self-copy management module 120 may reside in memory (not shown) and may be executed by a processor (not shown).

Figure 3:
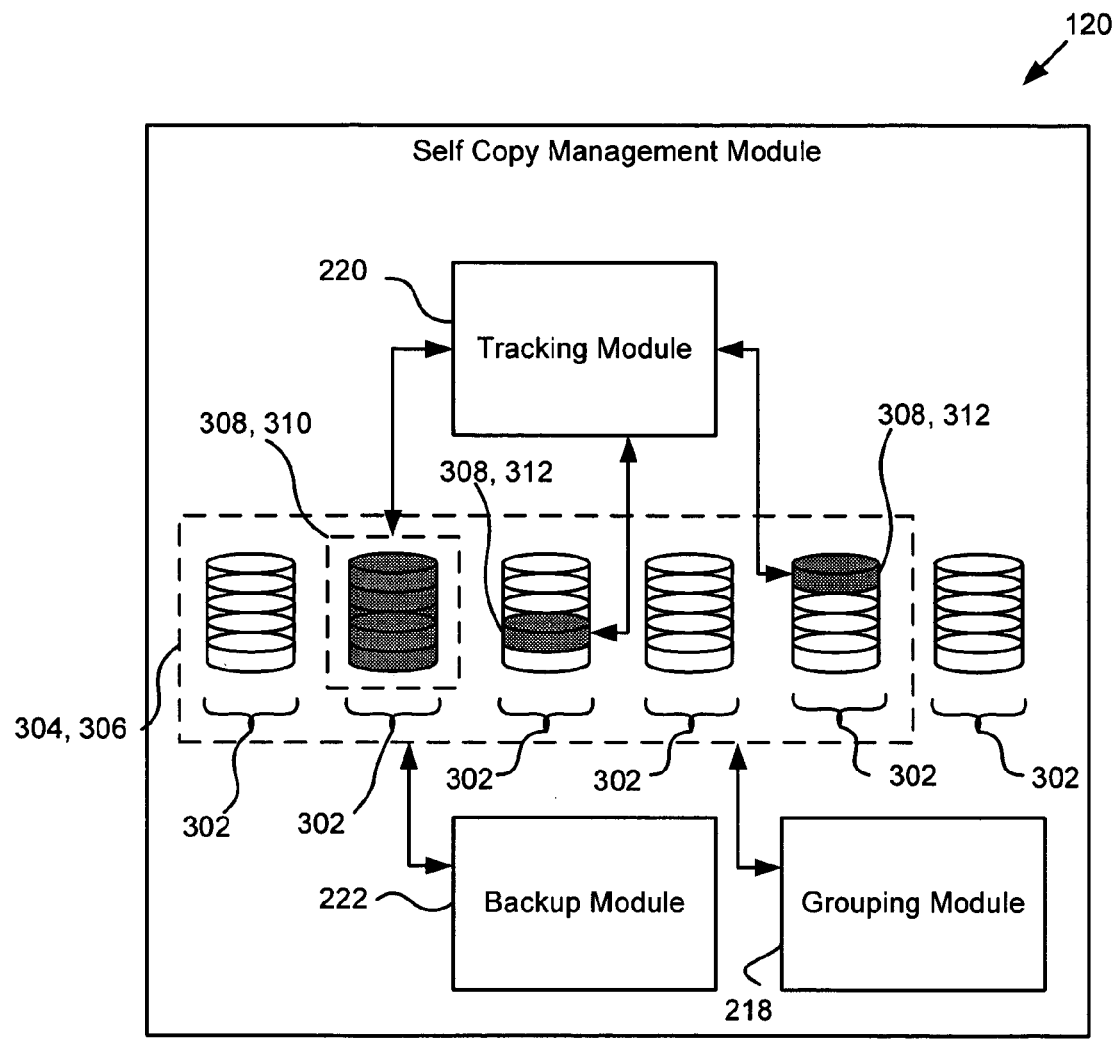
FIG. 3 is a schematic block diagram illustrating an apparatus for backing up data in accordance with the present invention.

Referring now to FIG. 3, an apparatus for automatically backing up data is illustrated. The apparatus 120, may be part of a system 100, 200 as described above, or may be a separate unit. The apparatus 120 includes a plurality of data cells 302. As discussed above, the data cells 302 are anything that is able to store data, including, but not limited to, volumes, tracks, logical unit numbers, control units, bits, bytes, and the like.

The apparatus 120 also includes a grouping module 118 configured to group one or more of the data cells 302 into a related group 304. In one embodiment, the group 304 is defined by a user. In another embodiment, the group 304 may be automatically defined by the system or apparatus according to one or more grouping algorithms. The data cells may be related by function, location, purpose, and the like. In one embodiment, the data cells are related simply at the discretion of a user to arbitrarily creates the relationship. The group may span one or more devices, systems, volumes, or locations.

In one embodiment, the group 304 is a consistency group 306. It will be appreciated by those of skill in the art that the consistency group 306 enables the creation of a consistent point-in-time copy for an application that uses data, which spans multiple volumes or systems. In one embodiment, the consistency group 306 may be designed to prevent initiation of a write I/O to the source volumes containing the group until completion of the copy of all the data in the group. It will further be appreciated by those of skill in the art that in this way, the apparatus 120 manages the consistency of dependent writes between the target and source storage devices.

The consistency group 306, in one embodiment, is a group of data cells 302 participating in relationships that need to keep the consistency of the logically related data that spans across them. In a production environment embodiment, the consistency group 306 may be the entire operating system, or self-contained subsets of the operating system that can be restored independently one from another.

The apparatus 120 includes a tracking module 220 to track activity on one or more data cells 308 in the group. It will be appreciated by those of skill in the art that such activity may include without limitation, writes, reads, changes in the date stamp of a particular data cell, other I/O activity, and the like. The predetermined data cells 308, may include entire volumes 310, or individual volume tracks 312. The data cells 302, 308 that are tracked by the tracking module 220 may be determined by the user, or by the system 100, 200 or apparatus 120. The data cells 308 may be all of the data cells 302 in the group 304, or some subset of the data cells 302 in the group 304.

The predetermined data cells 308 may include critical data that other data cells 302 in the group 304 rely heavily upon. In one embodiment, the data in the predetermined data cells includes a main data base table that is referenced or needed by the rest of the data base which may constitute the remainder of the group 304. In another embodiment, the predetermined data cells 308 may contain an application frequently used by functions, executables, or other structures, which may be stored in the remained of the data cells 302 that constitute the group 304.

In one embodiment, the tracking module 218 tracks activity on the data cells 302, 308 using bitmap technology. In another embodiment, the tracking module 218 uses software structures or data sets to keep track of the activity on the predetermined data cells 308. Where the group 304 consists of a database, and data cells 302 consists of database files, locally managed table spaces may use bitmaps to keep track of the free or used status of blocks in the database data files.

The apparatus 120 includes a backup module 222 for backing up the data stored in the group 304 of data cells 302 upon the occurrence of a predetermined triggering event identified by the tracking module 220. In one embodiment, the triggering event includes a change to the data residing on a predetermined data cell 308 in the group 304. This change may include a write, a change in the time stamp associated with the data, evidence of access to the data, and the like. Similarly, the trigging event may include a change to the data residing on a predetermined plurality of data cells 302 in the group 304. This configuration allows a user to specify that a data cell 302, or data cells 302, such as particular volume track or a number of volumes, will contain data important, or critical, to the user. The user may specify that the important data resides in the predetermined data cells 308. Thus, when there is a change to the critical data, the whole group 304 gets backed up at that instant, without having to wait for a scheduled data backup.

In another embodiment, the backup module 222 is configured to back up the data residing in the group 304 of data cells 302 when a predetermined threshold of changes to the data in the group 304 is reached. For example, in one embodiment, the group 304 is backed up when 10 megabytes of cumulative changes to the group 304 is reached. These changes may be writes or other I/O activity. The threshold may be in the sole discretion of the user. The threshold may also be determined by the computer, according to one or more tracking algorithms.

In one embodiment the backup module 222 backs up the group 304 by making an asynchronous copy of the group 304. In another embodiment, the backup module 222 backs up the group 304 by making a synchronous copy of the group 304. It will be appreciated by those of skill in the art that there are a number of ways to make synchronous and asynchronous copies of data, including but not limited to making a flash copy, making a peer-to-peer remote copy, making an extended remote copy, and the like.

The backup module 222 may employ various copy techniques to accomplish the teachings of this invention. For example, in one embodiment, the backup module 222 uses mirroring techniques. In another embodiment, the backup module 222 makes a point-in-time copy. It will be appreciated by those of skill in the art that data backup by volume-to-volume mirroring from a source storage to a target storage can be accomplished either synchronously or asynchronously. In certain embodiment, synchronous mirroring is used in order that the copying can be made transparent to applications on the central processing unit (CPU) and incur substantially no CPU overhead by direct control unit to control unit copying. In other embodiments, asynchronous mirroring is used to allow the CPU access rate of the primary volume to perform independent of the mirror copying.

Figure 4:
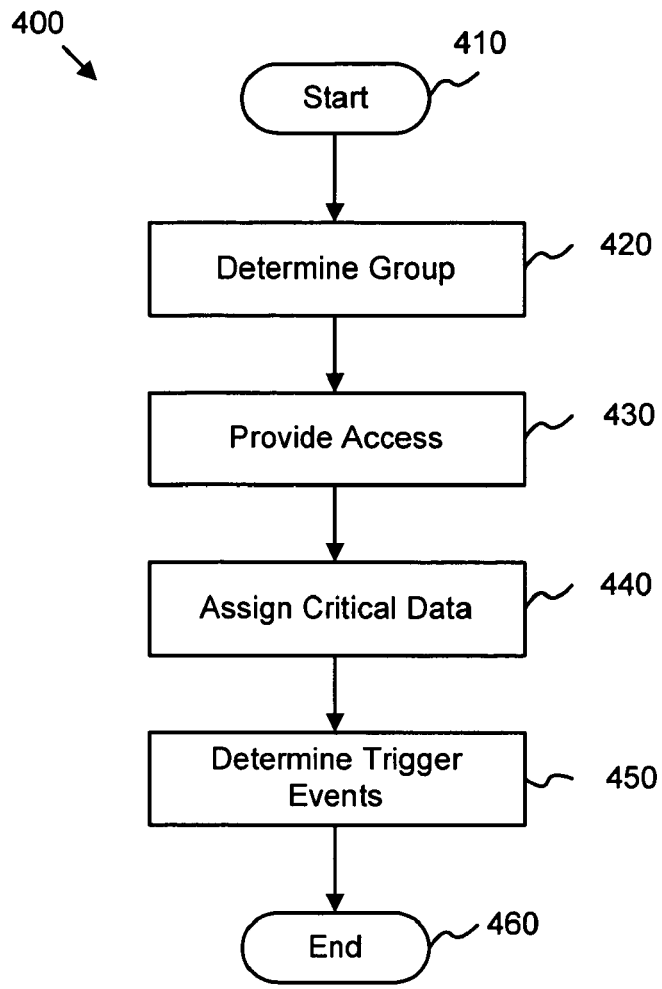
FIG. 4 is a schematic flow chart diagram illustrating one embodiment of a method for backing up data in accordance that may be implemented on the system of FIG. 2.
Figure 5:
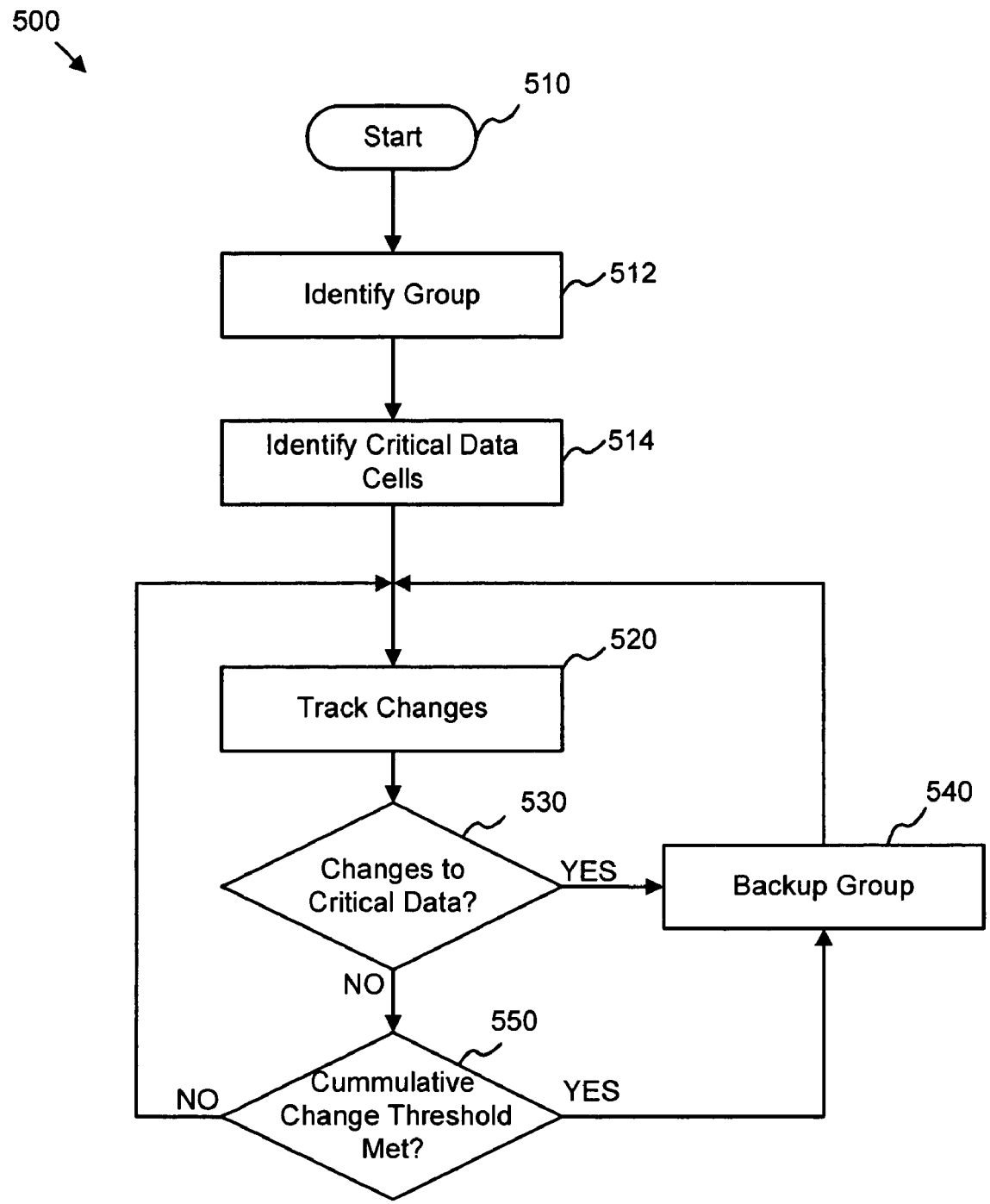
FIG. 5 is a schematic flow chart diagram illustrating one embodiment of a method for backing up data in accordance with the present invention.

The schematic flow chart diagrams of FIGS. 4 and 5 are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 4 illustrates a schematic flow chart diagram illustrating one embodiment of a method 400 for automatically backing up related data upon the occurrence of a triggering event. The method 400 may be facilitated by the self-copy apparatus 120 of FIG. 3. The method starts 410 by determining 420 a group of data cells. In one embodiment, the group is determined by a user or administrator creating arbitrary relationships between data cells. This may be done in the sole discretion of the administrator.

The group may also be determined based on the shared function or purpose of the data cells in the group. The group may be determined because of the dependency of certain information in a number of data cells on the data stored in a particular data cell. The group may be determined because the data stored in multiple data cells commonly utilizes an executable residing in a separate data cell. It may be determined to group a certain amount of data cells based simply upon their location relative to each other. Speed or system efficiency may also influence how data cells are grouped together. In one embodiment, for example, the group may consist of a database that the host system uses.

In one embodiment, the determination of what data cells are grouped together may be made by the system or apparatus itself, according to grouping algorithms, efficiency reports, statistical data, use patterns, and the like. The group may include all the data cells to which a user or system has access, or to some subset of the whole. The host systems are then provided access 430 to the related group of data cells. The user or administrator determines or assigns 440 critical data to be stored in one or more data cells. The determination of what data is critical and the assignment of that data to a particular data cell may be up to the sole discretion of the user or administrator. For example, a user or system administrator may determine that the main or primary table of a database that spans the group of data cells is critical because the entire remainder of the database relies heavily and interacts frequently with this table. The user or system administrator may assign 440 this particular table to one or more data cells that the host system accesses.

The user or administrator then determines 450 what events will trigger a backup of the group. In one embodiment, the triggering event may include activity to one of the data cells that are determined to be critical. In another embodiment, the triggering event may include activity to any of the data cells that are determined to be critical. In other words, the user may determine that entire group will be backed up when activity occurs to any one or the all of the data cells predetermined by the user or by the system to be critical. In one embodiment, the activity consists of a write the one or more predetermined data cells. In another embodiment, the activity may be a change in the time stamp associated with the one or more predetermined data cells. The activity may also include any I/O activity such as reads and the like.

In another embodiment, the administrator may determine that the group is to be backed up when a certain threshold of activity occurs to the group overall, whether or not the activity occurs in data cells determined to be critical by the user or administrator. It will be appreciated by those of skill in the art that in this way, and administrator or user can ensure that a backup of data stored in the group will automatically occur based on the quality (i.e. changes to critical data) or quantity (i.e. a predetermined threshold of activity) of changes to data cells within the group.

A signal bearing medium is also presented to store a program that, when executed, performs one or more operations to automatically back up a group of data. In one embodiment, the operations include performing the method steps outlined above. In another embodiment, the program starts 510 and identifies 512 the related group of data determined by a user or by the system. The program may then identify 514 the data cell or cells predetermined by the user to hold critical, important or arbitrary data in the sole discretion of the user.

The program may track 520 activity to one or more data cells in the group and automatically back up the group of data cells upon a triggering event. The program may determine 530 whether any changes have happened to the critical data, or in other words, data residing in predetermined data cell locations. If there has been changes, which could include, writes, reads, other I/O activity, and the like, then group is backed up 540 and the process begins again by identifying 512 the group. In one embodiment, the group is a consistency group and synchronous or asynchronous copy techniques using consistency group technology known in the art are used to perform the automatic backups of the data in the group.

If there have been no changes or activity to the data cells that are predetermined as containing data that the user wants to have automatically backed up, then the program determines 550 whether a cumulative change threshold has been met. If a cumulative change threshold such as described above has not been met, then the program starts over and continues to tracking activity. If a predetermined cumulative change threshold has been met, the program will back up 540 the group and continue to track changes.

In one embodiment, when the cumulative change threshold is met and data is backed up, a threshold marker resets to a value lower than the threshold. As activity occurs to data cells within the group, the threshold increases relative to the activity. The threshold marker is repeatedly compared to the threshold value and when the marker equals or exceeds the value, the group back up occurs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An apparatus to automatically back up data, the apparatus comprising:
    a grouping module configured to group one or more of a plurality of data cells into a related group;
    a tracking module to track activity on one or more data cells in the group; and
    a backup module for backing up the data stored in the group of data cells upon the occurrence of a predetermined triggering event identified by the tracking module, wherein the triggering event comprises a change to data residing on a predetermined data cell in the group.

2. The apparatus of claim 1, wherein the group comprises a consistency group.

3. The apparatus of claim 1, wherein the trigging event comprises a change to the data residing on a predetermined plurality of data cells in the group.

4. The apparatus of claim 1, wherein the backup module is configured to back up the data residing in the group of data cells when a predetermined threshold of changes to the data in the group is reached.

5. The apparatus of claim 1, wherein the data cells of the group reside on a plurality of physical devices.

6. The apparatus of claim 1, wherein backing up the group comprises making an asynchronous copy of the group.

7. The apparatus of claim 1, wherein backing up the group comprises making a synchronous copy of the group.

8. A system for automatically backing up data, the system comprising:
    a plurality of data cells, one or more of the data cells comprising a related group;
    a data communications network comprising a plurality of communication channels for transmitting data stored in the data cells;
    at least one source storage device coupled to the data communications network and configured to establish a plurality of communication links with a target storage device coupled to the data communications network;
    a host coupled to the data communications network configured to transmit read/write requests to the source storage device;
    Input/Output (I/O) devices coupled to the data communications network configured to interact with a user;
    a processor;
    a memory containing modules for execution on a processor, the modules comprising:
        a grouping module configured to group one or more of the data cells into the related group;
        a tracking module to track activity on one or more data cells in the group; and
        a backup module for backing up the data stored in the group of data cells upon the occurrence of a predetermined triggering event identified by the tracking module, wherein the triggering event comprises a change to data residing on a predetermined data cell in the group.

9. The system of claim 8, wherein the trigging event comprises a change to the data residing on a predetermined plurality of data cells in the group.

10. The system of claim 8, wherein the backup module is configured to back up the data residing in the group of data cells when a predetermined threshold of changes to the data in the group is reached.

11. The system of claim 8, wherein the data cells of the group reside on a plurality of physical devices.

12. The system of claim 8, wherein backing up the group comprises making an asynchronous copy of the group.

13. The system of claim 8, wherein backing up the group comprises making a synchronous copy of the group.

14. A program of executable code stored on a storage device and executable by a processor to perform an operation to automatically back up data, the operation comprising:

identifying a group comprising a plurality of data cells;

tracking activity to one or more data cells in the group; and backing up the group of data cells upon a triggering event to one or more data cells in the group, wherein the triggering event comprises a change to data residing on a predetermined data cell in the group.

15. The program of the claim 14, wherein the group comprises a consistency group.

16. The signal bearing medium of claim 14, wherein the triggering event comprises a change to a plurality of predetermined data cells in the group.

17. The program of claim 14, wherein the triggering event comprises a predetermined threshold of changes to the group.

* * * * *